Dec. 18, 1923.                                                            1,477,748
                        G. A. BISSELL
                         WATER METER
                       Filed Oct. 20, 1920
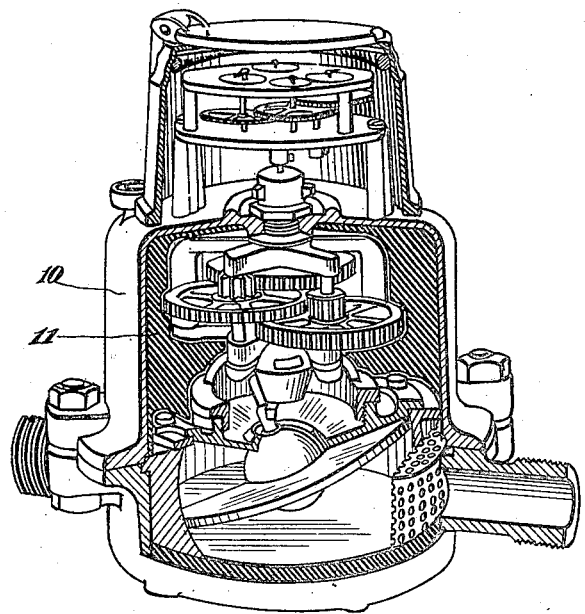
Inventor
GEORGE A. BISSELL
By 
Attorneys Patented Dec. 18, 1923.

1,477,748

UNITED STATES PATENT OFFICE.

GEORGE A. BISSELL, OF MINOT, NORTH DAKOTA.

WATER METER.

Application filed October 20, 1920. Serial No. 418,155.

*To all whom it may concern:*

Be it known that I, GEORGE A. BISSELL, a citizen of the United States, residing at Minot, in the county of Ward, State of North Dakota, have invented certain new and useful Improvements in Water Meters; and I do hereby declare the following to be a full, clear, and exact description of the invention, such as will enable others skilled in the art to which it appertains to make and use the same.

This invention relates to new and useful improvements in water meters and particularly to linings therefor.

The principal object of the invention is to provide a lining for a water meter which will readily be compressed under the expansive force of ice resulting from the freezing of the water in the meter, and whereby the casing of the meter will be prevented from injury.

Other objects and advantages will be apparent from the following description when taken in connection with the accompanying drawing.

In the drawing:

The figure is a sectional perspective view of a water meter showing the lining therein, which constitutes the improvement.

Referring particularly to the accompanying drawing 10 represents the casing of a water meter in which the lining 11 is secured. This lining is preferably formed from soft easily compressible rubber or rubber substitute and is secured to the inner face of the wall of the meter. This lining is of such thickness as to occupy such space as is not occupied by the mechanism of the meter and to permit the minimum amount of water to remain therein.

When the water, within the meter, becomes frozen the ice will expand and press against the rubber lining, thus being prevented from bursting the casing of the meter. Furthermore, the rubber lining will render the meter casing more perfectly leak-proof.

It will also be understood that the rubber is adapted to be secured to the walls of all spaces, within the meter casing, which are not occupied by moving parts both above and below the disk chamber.

What is claimed is:

The combination with a water meter and the mechanism contained therein, of a lining comprising a cylindrical body of soft live rubber having a central cavity opening through both ends of the body, said lining being secured to the walls of all spaces within the meter casing not occupied by the mechanism and being spaced away from the latter.

In testimony whereof, I affix my signature, in the presence of two witnesses:

GEORGE A. BISSELL.

Witnesses:
 MOODY O. EIDE,
 L. R. MILLER.